UNITED STATES PATENT OFFICE.

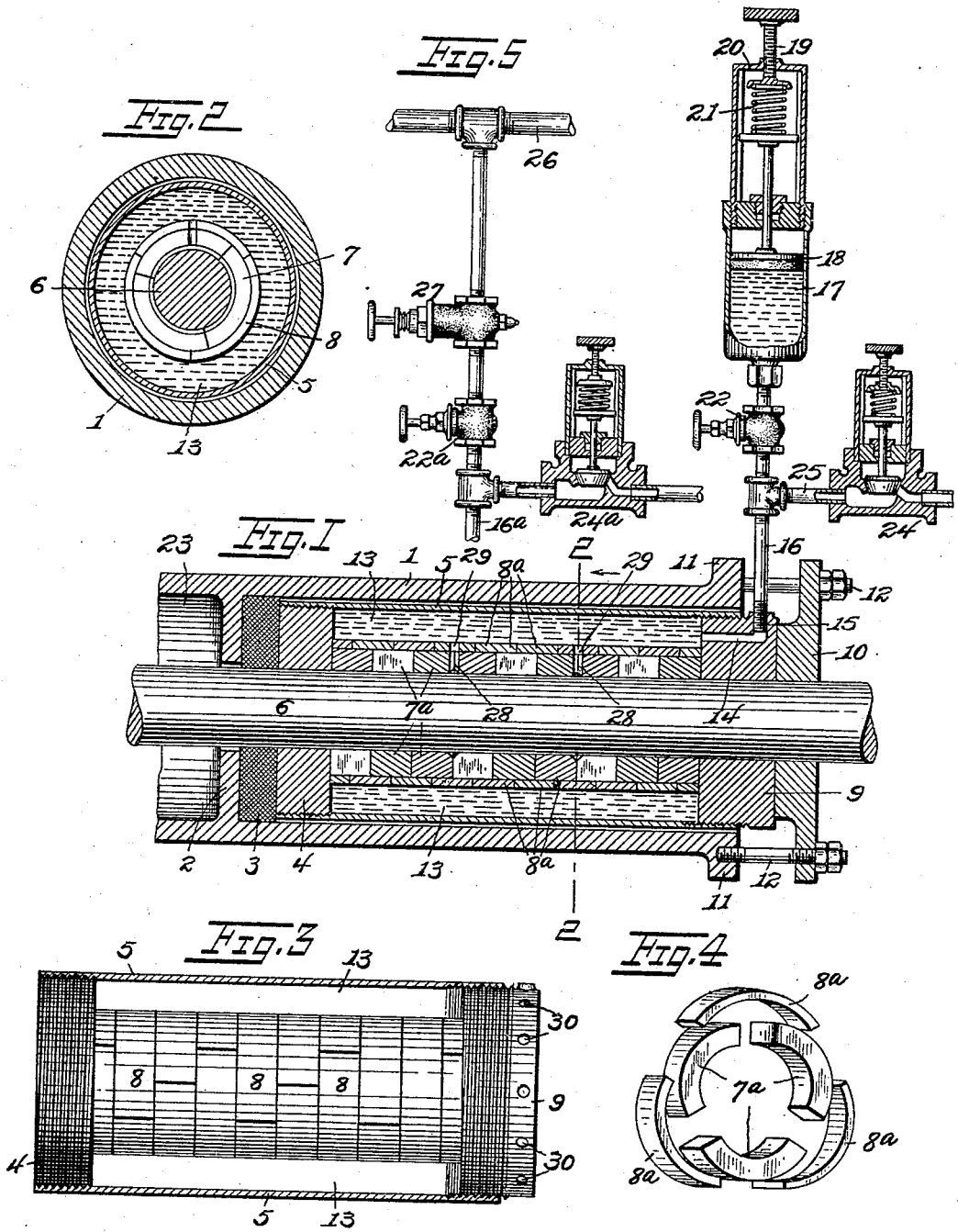

GEORGE STRANCE, REECE S. BULL, AND WILLIAM P. NORRIS, OF SISTERSVILLE, WEST VIRGINIA.

PACKING FOR STUFFING-BOXES.

943,169. Specification of Letters Patent. Patented Dec. 14, 1909.

Application filed March 26, 1908. Serial No. 423,340.

*To all whom it may concern:*

Be it known that we, GEORGE STRANCE, REECE S. BULL, and WILLIAM P. NORRIS, citizens of the United States of America, and residents of Sistersville, county of Tyler, and State of West Virginia, have invented certain new and useful Improvements in Packings for Stuffing-Boxes, of which the following is a specification.

This invention relates to improvements in packings for stuffing-boxes, and more particularly to a stuffing-box packing which is especially adapted for use in connection with the plungers of pumps and the like and normally surrounds or incloses the piston or plunger-rods of said pumps to form fluid or air-tight joints; and it consists in the particular construction, arrangement and combination of parts which will hereinafter be fully described.

The object of the invention is to provide a packing of the character mentioned which may be readily and conveniently inserted in and removed from the stuffing-box and which may be adjusted to exert any desired pressure upon the plunger or piston.

A further object is to provide a metallic packing for stuffing-boxes which is provided with means whereby it may be adjusted longitudinally while the plunger or piston is in operation. And a still further object of the invention is to provide means whereby wear of the plunger, or piston, and of the packing is automatically taken up or compensated for.

Other objects of the invention will hereinafter be made apparent in describing the invention in detail, in which description reference is herein had to the accompanying drawing, forming a part of this specification, in which—

Figure 1 is a longitudinal sectional view of a stuffing-box embodying our invention; Fig. 2 is a cross section of the same; Fig. 3 is a longitudinal section of the cylinder, showing the packing-rings in place therein; Fig. 4 is a detail perspective view, showing the ring-segments separated and illustrating the manner of assembling said segments with relation to each other; and Fig. 5 is a detailed view, showing the connection with a pressure-carrying line.

Referring to said drawing, in which like reference characters designate like parts throughout the several views—1 indicates the body of the stuffing-box which has an integral internal annular shoulder or abutment 2 at its inner end against which is seated a close-fitting gasket 3 of rubber or other suitable material; and seated against the inner face of said gasket is the plug-like end 4 of a hollow cylinder 5, said end 4 being in the form of an exteriorly-threaded plunger-embracing collar which is screwed up within the end of said cylinder, as shown.

Mounted within the cylinder 5 so as to hug or embrace the plunger rod 6 is a set of metallic packing-rings 7, each of which is composed of a plurality of segments $7^a$, and superposed over said rings 7 in such manner as to break joints, not only between the ends of the segments but also between rings, is a plurality of metallic packing-rings 8, each composed of a plurality of segments $8^a$. Screwed up within the outer end of the cylinder 5 so as to exert pressure upon said rings in a direction in line with the plunger rod 6 is an externally-threaded plunger-embracing plug 9. The length of the cylinder 5 is such that, when fitted within the stuffing-box, it stands substantially flush with or projects beyond the outer end of said stuffing-box 1, and a sufficient number of packing-rings are employed, or the plug 9 is made of such thickness, as to cause the latter, when screwed up firmly therein, to project a substantial distance beyond the end of the cylinder.

A gland 10 has its inner end in engagement with the plug 9, and said gland is connected to the flange 11 of the stuffing-box by means of bolts 12 which are adapted to be manipulated for adjusting the cylinder 5 against the gasket 3 for compressing the latter.

The edges and ends of the ring-segments are ground so that when fitted together, perfect ground-joints will be formed when pressure is simultaneously applied thereto in line with the plunger and against the plunger. For compressing the metallic packing-rings against said plunger, the chamber 13 between said rings and the walls of the stuffing-box 1 is filled with fluid, preferably a lubricating fluid, and a compression-device is employed for compressing said fluid. A bore or passage 14 communicating at one end with said chamber 13 is provided in the body of the plug 9, and a threaded socket 15 communicates at its inner end with the opposite end of the bore 14, said socket being directed into said plug from its outer periphery at a point adjacent to its outer face or end. Mounted in said socket 15 is the threaded end of a pipe 16 leading to the compression-device hereinbefore mentioned, which device consists of a reservoir 17 having therein an adjustable spring-pressed hydraulic piston 18 mounted for effecting displacement of the fluid and whereby the degree of pressure exerted upon the fluid may be regulated. The adjusting mechanism for said piston consists of an adjusting-screw 19 projected through the top 20 of the reservoir-casing, and a coil-spring 21 interposed between the end of said adjusting screw and the stem of said piston.

A valve or stop-cock 22, by means of which the supply of fluid to the stuffing-box may be controlled or cut off, is provided in said pipe 16.

As is evident, the spring 21, being compressible, will automatically relieve such excess pressure as may be created in the stuffing-box by the heating and the resultant expansion of the fluid contained therein.

For automatically releasing excess fluid which may escape or leak past the gasket 3 into the stuffing-box from the pump-cylinder 23, and consequently for relieving the stuffing-box from the excess pressure due to such leakage, a relief-valve 24 is employed, said valve being located between the compressor and the stuffing-box. Said relief-valve is preferably located on a branch-pipe 25 and may be of any appropriate form or character which is adapted to admit of the passage thereby of fluid only when the pressure exceeds a certain limit for which it is adjusted, the valve herein depicted being merely one of various forms of valves which might be employed.

In practice, the compressor is adjusted to effect the exertion of a certain pressure upon the fluid for compressing the packing-rings against the plunger, and the spring 21 yields to excess pressure due to the expansion of said fluid, thus automatically relieving such pressure.

The relief-valve 24 is adjusted to retain a greater pressure than that exerted by the compressor; hence, said valve is only called into play when leakage of the pump pressure into the stuffing-box occurs.

As is evident, instead of using the compressor illustrated in Fig. 1, a water-pressure line or steam-pressure line might be connected to the stuffing-box for exerting pressure upon the packing-rings. In such case, a pipe 16$^a$, tapped into the water or steam line 26, leads to the stuffing-box, as shown in Fig. 5. When water pressure is used, a relief-valve 24$^a$ and stop-cock 22$^a$ are employed in said pipe 16$^a$ precisely as when compressor is employed.

For regulating the pressure of the steam or fluid admitted into the stuffing-box to force the packing-rings against the plunger, a pressure-reducing regulator 27 of any ordinary approved type may be employed on said pipe 16$^a$.

In practice, when the device is used in connection with a steam pump instead of a fluid pump, steam is employed for forcing the packing rings against the plunger, as, if fluid were used, the expansion of said fluid, due to the heat, would be too great. As is apparent, when steam pressure is used, the employment of a relief-valve on the pipe 16$^a$ is rendered unnecessary.

The fluid contained within the stuffing-box acts as a cushion which admits of a limited movement of the packing-rings with respect to the plunger. Consequently, the plunger readily accommodates itself to any slight inaccuracy in the construction or stroke of the pump.

To provide for lubrication of the plunger, registering grooves 28 are provided in the adjacent edges of adjacent rings 7, forming a duct leading to said plunger, and bores 29 registering with the ducts are provided in the rings 8.

Located in the periphery of the plug 9 adjacent to the outer face or end thereof is one or more sockets 30 adapted for receiving the end of a rod or bolt by means of which said plug may be adjusted in the cylinder while the plunger is in operation.

Having thus described our invention, what we claim as new, and desire to secure by Letters Patent, is—

1. A stuffing-box comprising in combination with a piston-rod, a casing having an internal annular shoulder, a compressible gasket fitted against said shoulder, a cylinder fitted within said casing and bearing against said gasket, a plurality of packing rings fitted about the piston-rod within said cylinder, means for compressing said rings in axial alinement, fluid means for compressing said rings against said piston-rod, and means for securing said cylinder within said casing and against said gasket.

2. A stuffing box, comprising in combination with a piston-rod, a casing having an internal annular shoulder at its end, a compressible gasket fitted against said shoulder, a cylinder having its ends closed fitted within said casing and bearing against said gasket, a plurality of packing rings fitted about the piston-rod within said cylinder, there being an annular chamber formed between said rings and the interior of said cylinder, means for compressing said rings in axial alinement, fluid means in said chamber for radially compressing said rings, and means for regulating the pressure of said cylinder against said gasket.

3. A stuffing-box comprising in combination with a piston-rod, a casing having an internal annular shoulder at its inner end, a compressible gasket fitted against said shoulder, a cylinder fitted within said stuffing-box with its inner end against said gasket, a plurality of segmental packing-rings fitted about the piston-rod within said cylinder an annular chamber being formed between said rings and the interior of said cylinder, a plug threaded into the outer end of said cylinder and adjustable therein for compressing said rings in a direction in alinement with said piston-rod, fluid means in said chamber for compressing said rings against said piston-rod, and adjustable means engaging the outer end of said cylinder whereby the latter is held in gasket-compressing position.

4. A stuffing-box comprising in combination with a piston-rod, a casing having an internal annular shoulder at its inner end, a compressible gasket fitted against said shoulder, a cylinder fitted within said stuffing-box with its inner end against said gasket, a plurality of segmental packing-rings fitted about the piston-rod within said cylinder an annular chamber being formed between said rings and the interior of said cylinder, a plug threaded into the outer end of said cylinder and adjustable therein for compressing said rings in a direction in alinement with said piston-rod, adjustable fluid-compression means for entering a fluid into said chamber to cause said rings to closely embrace said piston rod, and adjustable means engaging the outer end of said plug whereby the latter is held in gasket-compressing position.

5. A stuffing box comprising in combination with a piston-rod, a casing having an internal annular shoulder, a compressible gasket fitted against said shoulder, a cylinder fitted within said casing and bearing against said gasket, a plurality of packing rings fitted about said piston-rod within said cylinder, means for compressing said rings in axial alinement, fluid means for compressing said rings against said piston-rod, and automatically regulating said compression, and means for securing said cylinder within said casing and against said gasket.

In testimony whereof we affix our signatures in presence of two witnesses.

GEORGE STRANCE.
   REECE S. BULL.
   WILLIAM P. NORRIS.

Witnesses:
 E. M. SOMMERVILLE,
 G. L. LOWTHER.